(12) United States Patent
Duncan et al.

(10) Patent No.: US 8,638,444 B2
(45) Date of Patent: Jan. 28, 2014

(54) SENSOR ARRAY CONFIGURATION FOR SWEPT-WAVELENGTH INTERFEROMETRIC-BASED SENSING SYSTEMS

(75) Inventors: Roger Glen Duncan, Christiansburg, VA (US); Brooks A. Childers, Christiansburg, VA (US); Daniel S. Homa, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 436 days.

(21) Appl. No.: 13/004,268

(22) Filed: Jan. 11, 2011

(65) Prior Publication Data

US 2012/0175513 A1    Jul. 12, 2012

(51) Int. Cl.
*G01B 9/02*    (2006.01)

(52) U.S. Cl.
USPC ........................................................ 356/478

(58) Field of Classification Search
USPC ........................................................ 356/478
See application file for complete search history.

(56) References Cited

U.S. PATENT DOCUMENTS

| | | | |
|---|---|---|---|
| 5,079,334 A | 1/1992 | Epstein et al. | |
| 5,848,204 A | 12/1998 | Wanser | |
| 6,018,534 A * | 1/2000 | Pan et al. | 372/6 |
| 6,266,465 B1 | 7/2001 | Hickey | |
| 6,452,681 B1 * | 9/2002 | Carver et al. | 356/450 |
| 6,876,786 B2 * | 4/2005 | Chliaguine et al. | 385/13 |
| 6,947,650 B1 | 9/2005 | Homa | |
| 6,995,899 B2 | 2/2006 | Aronstam | |
| 7,104,141 B2 | 9/2006 | Zerwekh et al. | |
| 7,257,301 B2 | 8/2007 | Homa et al. | |
| 7,282,698 B2 | 10/2007 | Childers | |
| 7,310,456 B1 | 12/2007 | Childers | |
| 7,319,514 B2 | 1/2008 | Ritchie et al. | |
| 7,338,215 B2 | 3/2008 | Reynolds | |
| 7,369,730 B2 | 5/2008 | Childers | |
| 7,379,631 B2 | 5/2008 | Poland et al. | |
| 7,421,905 B2 | 9/2008 | Zerwekh et al. | |
| 7,433,551 B2 | 10/2008 | Poland et al. | |
| 7,437,027 B2 | 10/2008 | Zerwekh et al. | |
| 7,471,860 B2 | 12/2008 | Coronado et al. | |
| 7,493,009 B2 | 2/2009 | Homa | |
| 7,509,000 B2 | 3/2009 | Coronado | |
| 7,526,160 B1 | 4/2009 | Homa et al. | |
| 7,557,339 B2 | 7/2009 | Poland et al. | |

(Continued)

OTHER PUBLICATIONS

International Search Report and Written Opinion dated Jun. 28, 2012 for International Application No. PCT/US2011/063868.

*Primary Examiner* — Tarfur Chowdhury
*Assistant Examiner* — Jonathon Cook
(74) *Attorney, Agent, or Firm* — Cantor Colburn LLP

(57) ABSTRACT

A method, system and apparatus for obtaining a parameter of interest relating to a wellbore is disclosed. A fiber optic cable having a plurality of sensors is disposed in the wellbore, wherein the plurality of sensors have reflectivity values configured to provide improved signal-to-noise ratio compared to signal-to-noise ratio of a plurality of sensors having substantially same reflectivity values. Light is propagated into the fiber optic cable from a light source and signals are received at a detector from the plurality of sensors in response to interaction of the propagated light with the plurality of sensors. A processor may be used to obtain the parameter of interest from the received signals. The fiber optic cable may be coupled to a member in the wellbore, wherein the parameter of interest is related to the member.

20 Claims, 4 Drawing Sheets

(56) References Cited

U.S. PATENT DOCUMENTS

| | | |
|---|---|---|
| 7,589,312 B2 * | 9/2009 | Kojima .................... 250/227.18 |
| 7,628,543 B2 | 12/2009 | Coronado |
| 7,664,347 B2 | 2/2010 | Childers et al. |
| 7,719,690 B2 | 5/2010 | Childers et al. |
| 7,744,292 B2 | 6/2010 | Stoesz |
| 7,752,870 B1 | 7/2010 | Homa |
| 7,792,405 B2 | 9/2010 | Stoesz et al. |
| 7,840,102 B2 | 11/2010 | Boyd |
| 7,920,270 B2 * | 4/2011 | Chow et al. .................... 356/478 |
| 2002/0063866 A1 | 5/2002 | Kersey et al. |
| 2002/0191299 A1 | 12/2002 | Jain |
| 2004/0067003 A1 | 4/2004 | Chliaguine et al. |
| 2005/0105902 A1 * | 5/2005 | Alavie et al. .................... 398/34 |
| 2008/0232425 A1 | 9/2008 | Hall et al. |
| 2009/0003760 A1 | 1/2009 | Stoesz et al. |
| 2009/0007652 A1 | 1/2009 | Childers |
| 2009/0045146 A1 | 2/2009 | Stoesz |
| 2009/0178802 A1 | 7/2009 | O'Malley |
| 2009/0252463 A1 | 10/2009 | Stoesz et al. |
| 2010/0091293 A1 | 4/2010 | Shani |
| 2010/0219334 A1 * | 9/2010 | Legrand et al. ............... 250/256 |

* cited by examiner

SENSOR ARRAY CONFIGURATION FOR SWEPT-WAVELENGTH INTERFEROMETRIC-BASED SENSING SYSTEMS

BACKGROUND OF THE DISCLOSURE

1. Field of the Disclosure

The present disclosure is related to improving a signal-to-noise ratio in a signal obtained from sensors in a fiber optic cable by reducing multi-path ringing along the fiber optic cable.

2. Description of the Related Art

In various aspects of oil exploration and production, optical sensors are deployed downhole and a light source at a surface location supplies light to the optical sensors via a fiber optic cable. Light interacts with the plurality of optical sensors to produce a reflected light having a signal that is returned to the surface location to be measured. Multiple reflections that can provide a noise signal known as ringing or multi-path interference are possible among the plurality of sensors. Since the optical sensors are generally evenly spaced within the fiber optic cable, the ringing signals are generally indistinguishable from a desired signal having only one reflection. The present disclosure provides a method and apparatus for reducing ringing in measurements obtained from a fiber optic cable having a plurality of sensors formed therein.

SUMMARY OF THE DISCLOSURE

In one aspect, the present disclosure provides a method of obtaining a parameter of interest relating to a wellbore, the method including: deploying a fiber optic cable having a plurality of sensors in the wellbore, wherein the plurality of sensors have reflectivity values configured to provide improved signal-to-noise ratio compared to signal-to-noise ratio of a plurality of sensors having substantially same reflectivity values; propagating light into the fiber optic cable from a light source; receiving signals from the plurality of sensors responsive to interaction of the propagated light with the plurality of sensors; and obtaining the parameter of interest from the received signals.

In another aspect, the present disclosure provides an apparatus for obtaining a parameter of interest relating to a wellbore, the apparatus including a fiber optic cable having a plurality of sensors in the wellbore, wherein the plurality of sensors have reflectivity values configured to provide improved signal-to-noise ratio compared to signal-to-noise ration of a plurality of sensors having substantially same reflectivity values; a light source configured to propagate light into the fiber optic cable; a detector configured to receive signals from the plurality of sensors responsive to interaction of the propagated light with the plurality of sensors; and a processor configured to obtain the parameter of interest from the received signals.

In yet another aspect, the present disclosure provides a system for obtaining a parameter of interest relating to a wellbore. The system includes a member disposed in the wellbore; a fiber optic cable having a plurality of sensors coupled to the member, wherein the plurality of sensors have reflectivity values configured to provide improved signal-to-noise ratio compared to signal-to-noise ration of a plurality of sensors having substantially same reflectivity values; a light source configured to propagate light into the fiber optic cable; a detector configured to receive signals from the plurality of sensors responsive to interaction of the propagated light with the plurality of sensors; and a processor configured to obtain the parameter of interest from the received signals.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, reference should be made to the following detailed description of the exemplary embodiment, taken in conjunction with the accompanying drawings, in which like elements have been given like numerals and wherein.

DETAILED DESCRIPTION OF THE DISCLOSURE

Figure 1:
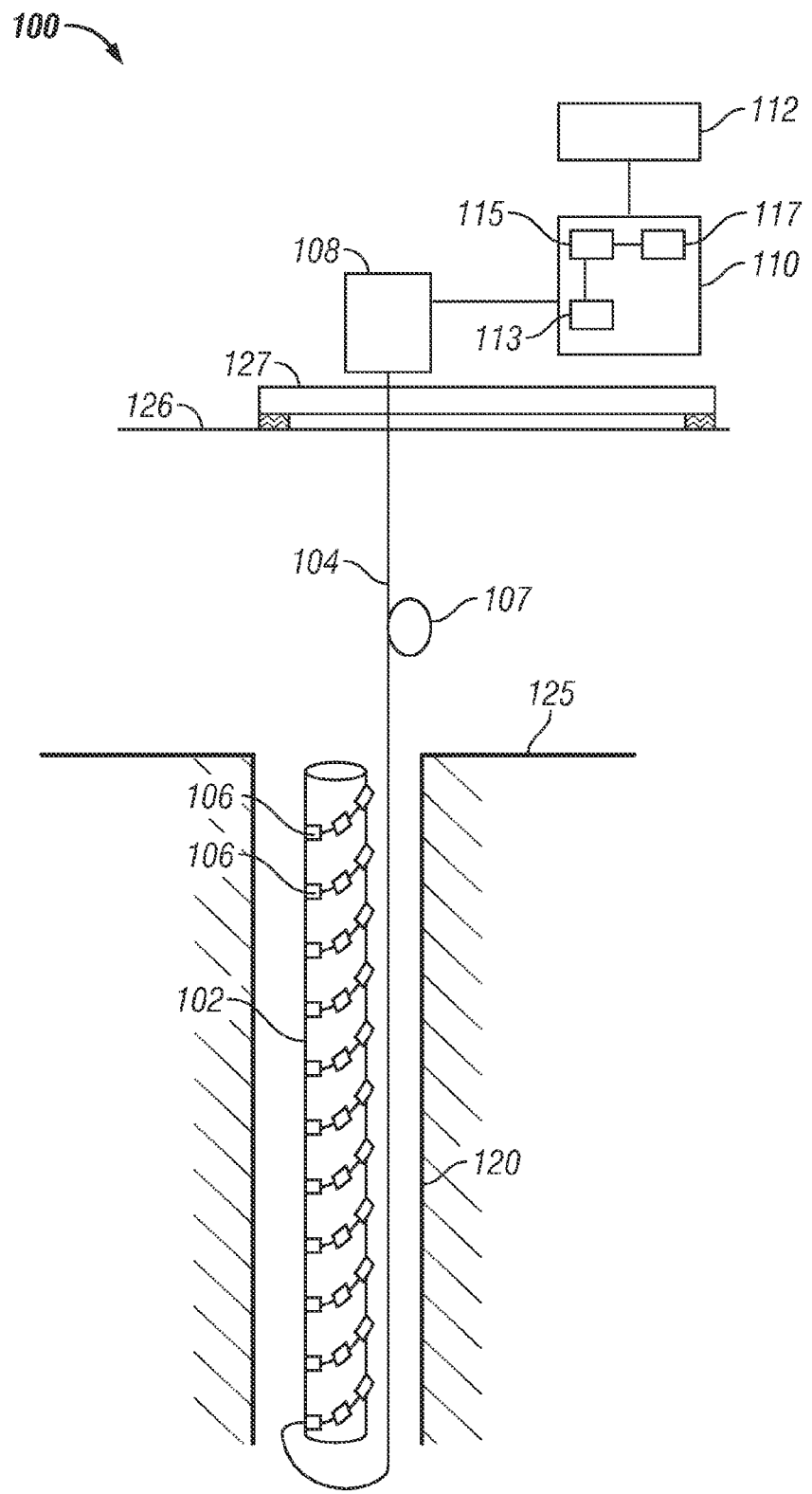
FIG. 1 shows an exemplary system having a plurality of downhole sensors in a wellbore which can be monitored using the exemplary methods described herein.

FIG. 1 shows an exemplary oil production system 100 suitable for use with the exemplary methods and optical system described herein. The exemplary production system 100 of FIG. 1 includes a tubular 102 in wellbore 120 in optical communication with surface electronics via fiber optic cable 104. Fiber optic cable 104 includes a plurality of sensors 106. Each of the plurality of sensors 106 is configured to provide an optical signal upon interaction with a light propagating in the fiber optic cable 104. The fiber optic cable 104 is wrapped around the surface of the tubular 102 and each of the plurality of sensors 106 is thereby attached at a particular location to tubular 102. A change in a parameter, such as strain or temperature, at the particular location is therefore detected by the sensor attached at or near the particular location, which thus provides a signal corresponding to the detected change in parameter. These signals may be processed at surface electronics to obtain the parameter such as, for example, a strain, a temperature or a deformation of the tubular. Therefore, the fiber optic cable and sensors may be used, for example, in various methods such as Real Time Compaction Monitoring (RTCM), Distributed Temperature Sensing (DTS), optical frequency domain reflectometry (OFDR), or any applicable methods using swept-wavelength interferometry.

Fiber optic cable 104 is coupled at the surface location to an interrogation unit 108. The interrogation unit 108 may include a light source (not shown), typically a tunable laser for providing light to the sensors via fiber optic cable 104, and circuitry for obtaining signals from light received from the plurality of sensors 106. Interrogation unit 108 may be coupled to a data processing unit 110 and in one aspect transmits obtained signals to the data processing unit. In one aspect, the data processing unit 110 receives and processes the measured signals from the interrogation unit 108 to obtain a parameter, such as a measurement of wavelength, strain or temperature at the tubular. In various aspects, data processing unit 110 includes at least one memory 115 having various programs and data stored therein, a computer or processor 113 accessible to the memory and configured to access one or more of the programs and/or data stored therein to obtain the parameter, and a recording medium 117 for recording and storing the obtained parameter. The data processing unit 110 may output the parameter to various devices, such as a display 112 or the recording medium 117.

The exemplary production system 100 of FIG. 1 is a subsea oil production system including sensors at a tubular 102 at a sea bottom location 125 in communication with surface electronics (i.e., interrogation unit 108) located at a sea platform 127 at sea level 126. However, FIG. 1 is provided only as an illustration and not as a limitation of the present disclosure. The system may alternately be deployed at a land location and may include an oil exploration system, an oil production system, a measurement-while-drilling tool, or a wireline logging device, among others. In addition, the system may be suitable for use with any member used in an application.

Figure 2:
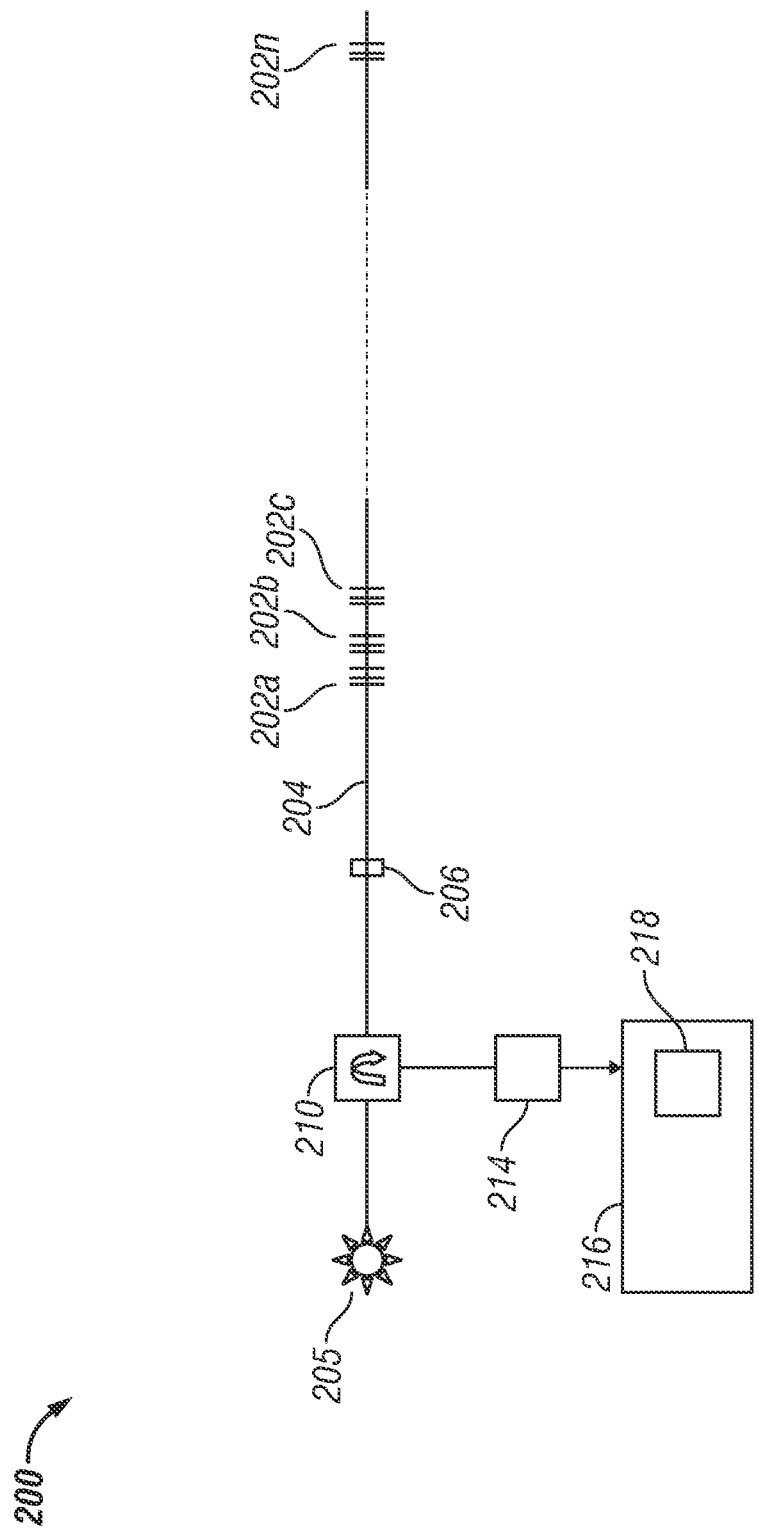
FIG. 2 shows an exemplary optical system suitable for obtaining a parameter of the exemplary system of FIG. 1.

FIG. 2 shows a diagram of an exemplary optical system 200 suitable for obtaining a signal related to parameter of the exemplary system of FIG. 1. The exemplary optical system 200 includes a light source 205, a fiber optic cable 204 including a plurality of sensors (202a, 202b, 202c, ..., 202n, and referred to collectively as sensors 202) formed therein and a detector 214 to detector light signals from the plurality of sensors 202. In the exemplary embodiment of FIG. 2, light is transmitted from the light source 205 to circulator 210. A circulator generally includes a plurality of ports circularly ordered for light input and output. The circulator is configured so that light entering any port is transmitted to and exits the next port in rotation. Circulator 210 provides the light from light source 205 to fiber optic cable 204 and provides light returning from the fiber optic cable to detector 214. Therefore, light from the light source 205 propagates into the fiber optic cable 204. Upon interaction of the propagated light with the sensors, signals are produced which are returned to the circulator to be received at detector 214. Detector 214, in one aspect, produces an electrical signal having the waveform of the received signals. In various embodiments, detector 214 may be a photo detector, a charge-coupled device, optical-electrical converter, among others. The electrical signal at the detector may be sent to circuitry 216 which may include various optical and electrical devices. In one aspect, circuitry 216 includes a processor 218 configured to obtain a signal from the electric signal received at circuitry 216.

In an exemplary embodiment, light source 205 is a tunable laser light source that is configured to provide a light having a wavelength that sweeps across a range of wavelengths at a selected rate. The light source may be any tunable light source or a swept-wavelength light source that provides a light beam that sweeps across a range of wavelengths. In various aspects, the light source may be a continuous light source or a broadband light source having a filter configured to sweep a range of wavelengths. The range of wavelengths and a sweep rate of the light source may be pre-programmed, provided by a controller running software or provided by an operator.

In an exemplary embodiment, sensors 202 are Fiber-Bragg Gratings. An FBG is a periodic change in the refractive index of the core of an optical fiber and is typically created using a laser etching process. A grating reflects a percentage of incoming light, but only at a specific wavelength known as the Bragg wavelength, which is related to the grating period. Stresses or environmental factors, such as thermal changes or mechanical stress, affect the grating period and therefore produce changes in the Bragg wavelength. Thus, an operator observing a wavelength of reflected light from an FBG can determine the relevant environmental factor, i.e., temperature, strain, etc.

Typically, in order to determine the Bragg wavelength for a selected sensor, light source 205 sweeps across a range of wavelengths. Since there are many sensors in the fiber optic cable, a plurality of light reflections can occur in the optical fiber, each light reflection corresponding to a signal from a selected sensor at a particular wavelength and a particular optical path length or optical delay of the sensor. Since exemplary tubular 102 extends a significant distance, optical path lengths may vary significantly over the length of the tubular.

Figure 3:
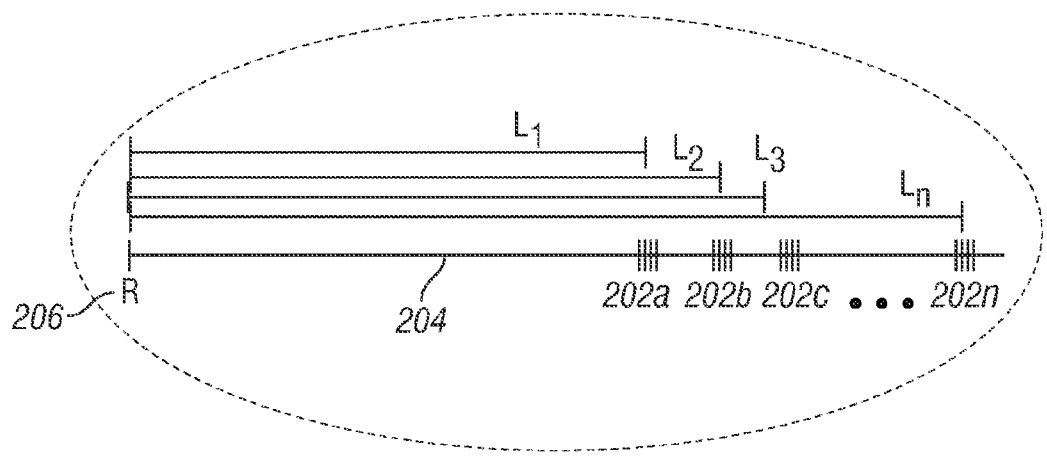
FIG. 3 shows a detailed view of the exemplary fiber optic cable of FIG. 2.

FIG. 3 shows a detailed view of the exemplary fiber optic cable 204 of FIG. 2 showing reference reflector 206 and exemplary sensors 202a, 202b, 202c, ..., 202n. Reference reflector 206 provides a light at the wavelength of the light source 205 and is set at a selected reference position in the fiber optic cable with respect to sensors 202. The reference reflector 206 is shown at an end of the fiber optic cable proximate light source 205. In another embodiment, the reference reflector may be at a distal end of the fiber optic cable from the light source. Light reflected from a selected sensor interferes with light reflected from the reference reflector 206 to produce a signal. FIG. 3 shows distances ($L_1, L_2, \ldots, L_n$) of each sensor (202a, 202b, 202c, ..., 202n) from the reference reflector 206. Incoming light generally travels from left to right. Therefore, $L_1, L_2, \ldots, L_n$ are the additional distances light travels beyond the reference reflector to reach a respective sensor and twice these distance are the optical path differences, often referred to as optical delays, of the sensors with respect to the reference reflector. Each sensor signal is modulated by a spatial frequency or 'beat' frequency that is directly related to its distance to the reference reflector. The interference signal for a particular grating can be expressed as:

$$D = \sum_i R_i \cos\left(\frac{4\pi n L_i}{\lambda}\right) \qquad (1)$$

where D is the detected signal, $R_i$ is the reflected spectrum of the $i^{th}$ grating, n is the effective refractive index of the fiber optic cable, $\lambda$ is the wavelength of the light, and $L_i$ is the distance from the $i^{th}$ grating to the reference reflector.

Figure 4:
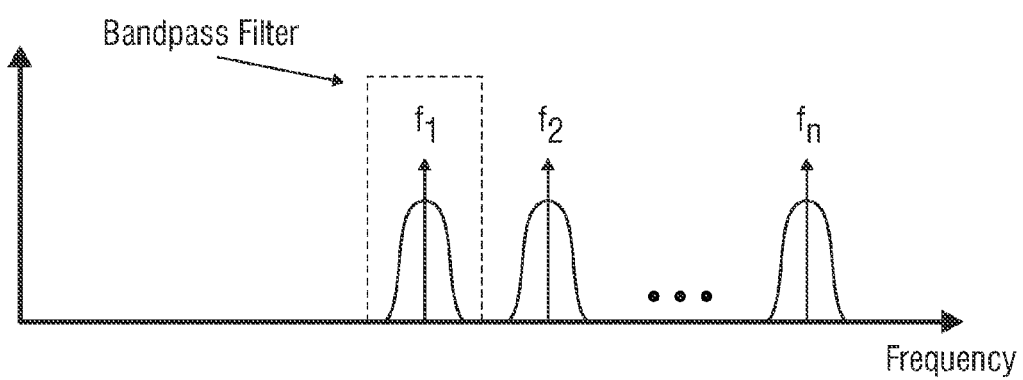
FIG. 4 shows a spatial frequency domain with a plurality of beat frequencies related to selected sensors of FIG. 3.

FIG. 4 shows a spatial frequency domain with a plurality of beat frequencies. Each beat frequency relates to a particular sensor (i.e., $f_1$ is related to sensor 202a, for example). By selecting a particular frequency, an operator, may select a spectrum related to a particular sensor and measure the signal from the particular sensor. The beat frequency may be selected, for example, by creating a bandpass filter around the particular frequency, as shown in FIG. 4.

Due to the plurality of sensors 202 on fiber optic cable 204, noise occurs in the fiber optic cable due to multi-path interference or 'ringing'. Multi-path interference can be understood via the following illustrative example: Referring to FIG. 2 or FIG. 3, a first optical delay for sensor 202c with respect to reference reflector is $2*L_3$. It is possible that light also reflects off of multiple sensors and have the same optical delay ($2*L_3$). For example, light may travels from the reference reflector 206 to sensor 202b, be reflected at sensor 202b towards sensor 202a, be reflected at sensor 202a towards sensor 202b, and be reflected at sensor 202b to return to reference reflector 206. Due to the generally even spacing between sensors, the optical delay for the multiply-reflected light is also $2*L_3$. However, the signal from such multiply-reflected light is noise. Referring to Eq. (1), detected signal D for FBG 202c includes the noise from multi-path interference between FBG 202a and FBG 202b. In general, sensors having a higher spatial frequency (i.e. sensor 202n) are more affected by multi-path interference, while sensors having lower spatial frequencies (i.e. sensors 202a, 202b) are less affected.

Figure 5A:
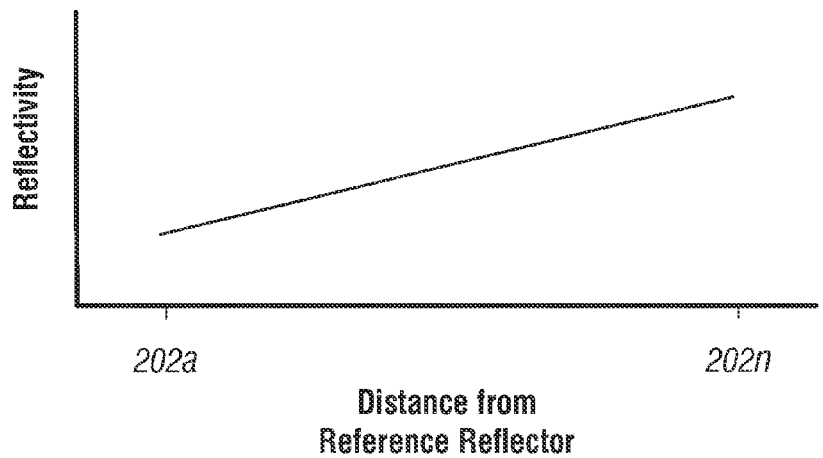
FIGS. 5A-C shows an exemplary relation between reflectivity and distance of a sensors to a reference reflector in various embodiments of the present disclosure.
Figure 5B:
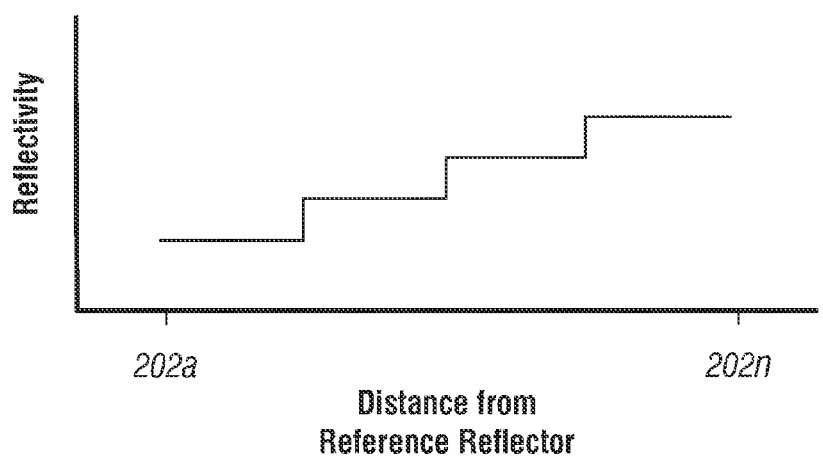
Figure 5C:
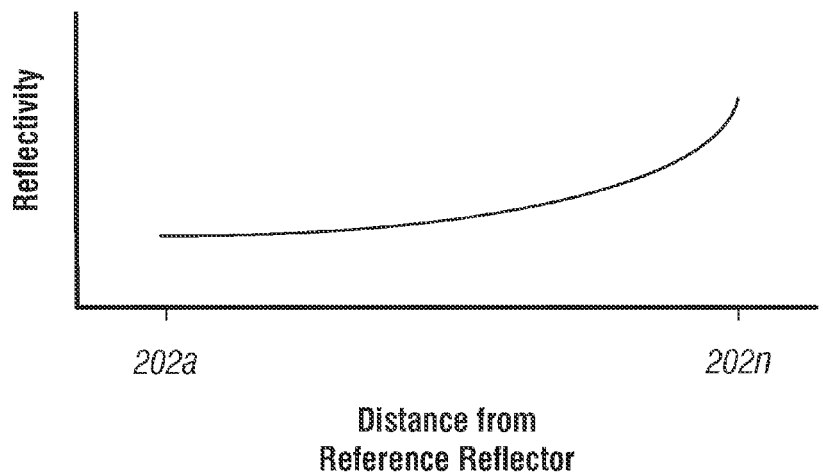

In one aspect, the present disclosure provides a fiber optic cable with a plurality of sensors (i.e., FBGs 202), wherein the reflectivities of the plurality of sensors are configured to provide an improved signal-to-noise ratio compared to a signal-to-noise ratio of a plurality of sensors having substantially the same reflectivity values among its sensors. In exemplary embodiments, the reflectivity value for the sensor that is closest to the light source is lower than the reflectivity value of the sensor that is farthest from the light source. In alternate embodiments, the reflectivity value for the sensor farthest from the light source is lower than the reflectivity value of the sensor that is closest to the light source. The reflectivity value of a selected sensor can be related to a distance from the selected sensor to the light source. Alternately, the reflectivity value of a sensor can be related to a location of the sensor within the fiber optic cable. FIGS. 5A-C show various relations between reflectivity values and the distance between the selected sensor and the light source. FIG. 5A shows a reflectivity values related linearly to distance. FIG. 5B show a power function relationship between reflectivity and distance. FIG. 5C shows reflectivity changing via a step function relationship. In one embodiment a low reflectivity value is less than −45 dB and a high reflectivity value is greater than −35 dB. In an alternate embodiment, the low reflectivity value is greater than −45 dB and the high reflectivity value is less than −35 dB.

In the exemplary embodiment, sensors having low spatial frequencies have low reflectivity. Although low reflectivity values provides weakly reflected signals, the degree of multi-path interference is minimal for these sensors, thus the signal-to-noise ratio for such low spatial frequency sensors is acceptable. Sensors having high spatial frequencies have a high reflectivity, thereby providing a strong reflected signal. Although these sensors are more susceptible to multi-path interference, the sensors providing such interference generally have lower reflectivity values. Thus, the reflected noise signal is smaller. In addition, the action of multiple reflections at weakly reflecting surfaces further reduced the noise signal. Thus, the signal-to-noise ratio for high spatial frequency sensors is also acceptable.

Therefore, in one aspect, the present disclosure provides a method of obtaining a parameter of interest relating to a wellbore, the method including: deploying a fiber optic cable having a plurality of sensors in the wellbore, wherein the plurality of sensors have reflectivity values configured to provide improved signal-to-noise ratio compared to signal-to-noise ratio of a plurality of sensors having substantially same reflectivity values; propagating light into the fiber optic cable from a light source; receiving signals from the plurality of sensors responsive to interaction of the propagated light with the plurality of sensors; and obtaining the parameter of interest from the received signals. In one embodiment, the reflectivity value of the sensor closest to the light source is lower than the reflectivity value of the sensor farthest from the light source. The reflectivity value of a selected sensor is related to one of: a distance of the selected sensor from the light source; and location of the selected sensor in the fiber optic cable. In exemplary embodiments, the reflectivity value of the selected sensor may be related to distance in a manner that is one of: (i) linearly, (ii) as a power function, and (iii) in one or more steps. In one embodiment, the least reflective value of any sensor in the plurality of sensors is greater than −45 dB and a most reflective value of any sensor in the plurality of sensors is less than −35 dB. The method further includes applying a filter to select a signal corresponding to a sensor in the plurality of sensors. The parameter of interest may be stress at a member, temperature, or deformation of a member, for example.

In another aspect, the present disclosure provides an apparatus for obtaining a parameter of interest relating to a wellbore, the apparatus including a fiber optic cable having a plurality of sensors in the wellbore, wherein the plurality of sensors have reflectivity values configured to provide improved signal-to-noise ratio compared to signal-to-noise ration of a plurality of sensors having substantially same reflectivity values; a light source configured to propagate light into the fiber optic cable; a detector configured to receive signals from the plurality of sensors responsive to interaction of the propagated light with the plurality of sensors; and a processor configured to obtain the parameter of interest from the received signals. The reflectivity value of the sensor closest to the light source is lower than reflectivity value of the sensor farthest from the light source. The reflectivity value of a selected sensor is related to one of: a distance of the selected sensor from the light source; and location of the selected sensor in the fiber optic cable. The reflectivity value may relate to distance in a manner that is one of: (i) linearly, (ii) as a power function, and (iii) in one or more steps. In one embodiment, the least reflective value of any sensor in the plurality of sensors is greater than −45 dB and a most reflective value of any sensor in the plurality of sensors is less than −35 dB. The processor may be further configured to apply a filter to select a signal corresponding to a sensor in the plurality of sensors. The parameter of interest may be stress at a member, temperature, or deformation of a member, for example.

In yet another aspect, the present disclosure provides a system for obtaining a parameter of interest relating to a wellbore. The system includes a member disposed in the wellbore; a fiber optic cable having a plurality of sensors coupled to the member, wherein the plurality of sensors have reflectivity values configured to provide improved signal-to-noise ratio compared to signal-to-noise ration of a plurality of sensors having substantially same reflectivity values; a light source configured to propagate light into the fiber optic cable; a detector configured to receive signals from the plurality of sensors responsive to interaction of the propagated light with the plurality of sensors; and a processor configured to obtain the parameter of interest from the received signals. In one embodiment, the reflectivity value of the sensor closest to the light source is less than reflectivity value of the sensor farthest from the light source. The reflectivity value of a selected sensor in the plurality of sensors may be related to one of: a distance of the selected sensor from the light source; and location of the selected sensor in the fiber optic cable. The reflectivity value of the selected sensor may be related to distance in a manner that is one of: (i) linearly, (ii) as a power function, and (iii) in one or more steps. In one embodiment, a least reflective value of any sensor in the plurality of sensors is greater than −45 dB and a most reflective value of any sensor in the plurality of sensors is less than −35 dB.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of obtaining a parameter of interest relating to a wellbore, comprising:
   deploying a fiber optic cable having a plurality of fiber Bragg gratings in the wellbore, wherein reflectivities of the plurality of fiber Bragg gratings are selected to provide improved signal-to-noise ratio compared to signal-to-noise ratio of a plurality of fiber Bragg gratings having a substantially same reflectivity;
   propagating light into the fiber optic cable from a light source;
   receiving signals from the plurality of fiber Bragg gratings responsive to interaction of the propagated light with the plurality of fiber Bragg gratings; and obtaining the parameter of interest from the received signals.

2. The method of claim 1, wherein a reflectivity of a fiber Bragg grating closest to the light source is lower than a reflectivity of a fiber Bragg grating farthest from the light source.

3. The method of claim 1, wherein a reflectivity of a selected fiber Bragg grating in the plurality of fiber Bragg gratings is related to one of: a distance of the selected fiber Bragg grating from the light source; and a location of the selected fiber Bragg grating in the fiber optic cable.

4. The method of claim 3, wherein a relation between a reflectivity of a selected fiber Bragg grating and the distance of the selected fiber Bragg grating from the light source is one of: (i) a linear relation, (ii) a power function relation, and (iii) a relation having one or more step functions.

5. The method of claim 1, wherein a reflectivity for a selected fiber Bragg grating is greater than −45 dB and less than −35 dB.

6. The method of claim 1 further comprising applying a filter to select a signal corresponding to a selected fiber Bragg grating.

7. The method of claim 1, wherein the parameter of interest is selected from the group consisting of: (i) stress at a member; (ii) temperature; and (iii) deformation of a member.

8. The apparatus of claim 1, wherein a reflectivity of a fiber Bragg grating closest to the light source is less than a reflectivity of a fiber Bragg grating farthest from the light source.

9. An apparatus for obtaining a parameter of interest relating to a wellbore, comprising:
   a fiber optic cable having a plurality of fiber Bragg gratings in the wellbore, wherein reflectivities for the plurality of fiber Bragg gratings are selected to provide improved signal-to-noise ratio compared to signal-to-noise ratio of a plurality of fiber Bragg gratings having a substantially same reflectivity;
   a light source configured to propagate light into the fiber optic cable;
   a detector configured to receive signals from the plurality of fiber Bragg gratings responsive to interaction of the propagated light with the plurality of fiber Bragg gratings; and
   a processor configured to obtain the parameter of interest from the received signals.

10. The apparatus of claim 9, wherein a reflectivity of a selected fiber Bragg grating in the plurality of fiber Bragg gratings is related to one of: a distance of the selected fiber Bragg gratings from the light source; and a location of the selected fiber Bragg grating in the fiber optic cable.

11. The apparatus of claim 10, wherein a relation between a reflectivity of a selected fiber Bragg grating and the distance of the selected fiber Bragg grating from the light source is is one of: (i) a linear relation, (ii) a power function relation, and (iii) a relation having one or more step functions.

12. The apparatus of claim 9, wherein a reflectivity for a fiber Bragg grating in the plurality of fiber Bragg gratings is greater than −45 dB and is less than −35 dB.

13. The apparatus of claim 9, wherein the processor is further configured to apply a filter to select a signal corresponding to a selected fiber Bragg grating.

14. The apparatus of claim 9, wherein the processor is further configured to obtain the parameter of interest selected from a group consisting a: (i) stress at a member; (ii) temperature; and (iii) deformation of a member.

15. A system for obtaining a parameter of interest relating to a wellbore, comprising:
   a member disposed in the wellbore;
   a fiber optic cable having a plurality of fiber Bragg gratings coupled to the member, wherein the reflectivities of the plurality of fiber Bragg gratings are selected to provide improved signal-to-noise ratio compared to signal-to-noise ratio of a plurality of fiber Bragg gratings having a substantially same reflectivity;
   a light source configured to propagate light into the fiber optic cable;
   a detector configured to receive signals from the plurality of fiber Bragg gratings responsive to interaction of the propagated light with the plurality of fiber Bragg gratings; and
   a processor configured to obtain the parameter of interest from the received signals.

16. The system of claim 15, wherein a reflectivity of a fiber Bragg grating closest to the light source is less than a reflectivity of a fiber Bragg grating farthest from the light source.

17. The system of claim 15, wherein a reflectivity of a selected fiber Bragg grating in the plurality of fiber Bragg gratings is related to one of: a distance of the selected fiber Bragg grating from the light source; and a location of the selected fiber Bragg grating in the fiber optic cable.

18. The system of claim 17, wherein a relation between a reflectivity of a selected fiber Bragg grating and the distance of the selected fiber Bragg grating from the light source is one of: (i) a linear relation, (ii) a power function relation, and (iii) a relation that includes one or more step functions.

19. The system of claim 15, wherein a reflectivity for a fiber Bragg grating in the plurality of fiber Bragg gratings is greater than −45 dB and is less than −35 dB.

20. The system of claim 15, wherein the processor is further configured to obtain the parameter of interest selected from a group consisting a: (i) stress at the member; (ii) temperature; and (iii) deformation of the member.

* * * * *